May 3, 1927.
J. RIDDLE
1,626,694
GALVANOMETER AND LIKE RECORDING INSTRUMENT
Filed Nov. 21, 1924
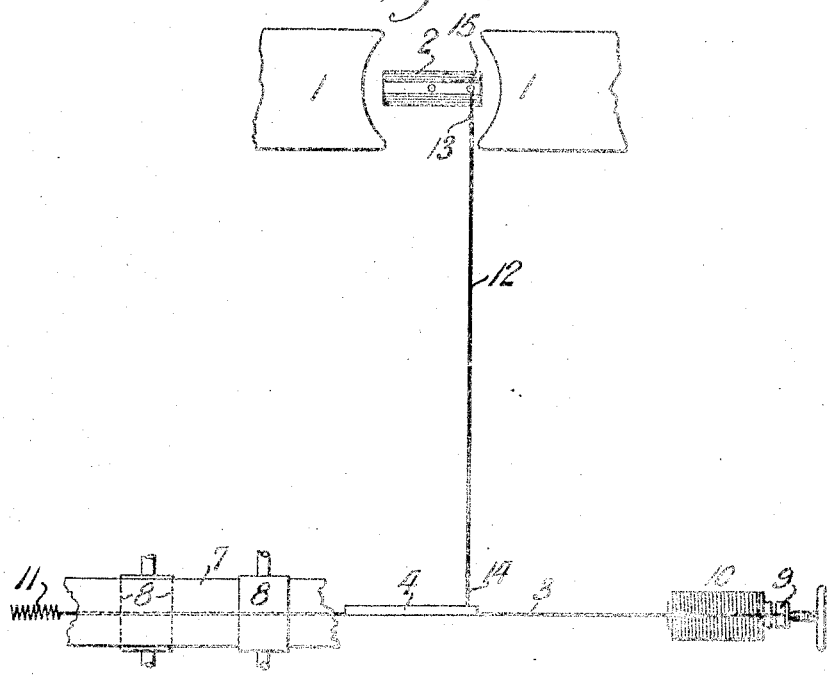
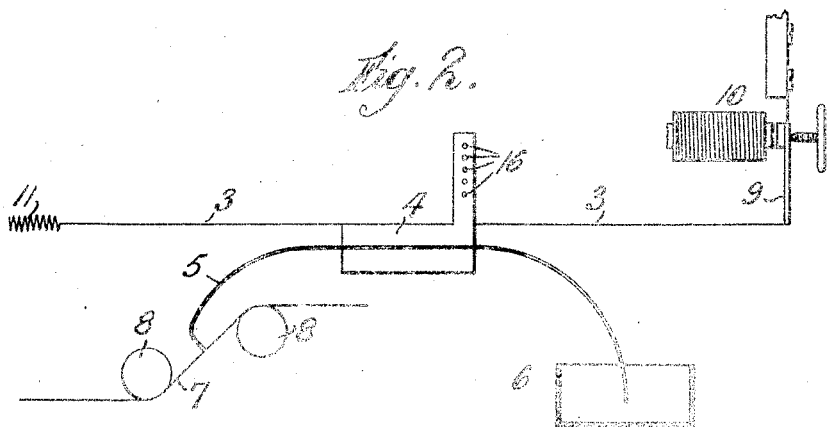
INVENTOR:
JOHN RIDDLE,
By his Attorneys Patented May 3, 1927.

1,626,694

UNITED STATES PATENT OFFICE.

JOHN RIDDLE, OF LONDON, ENGLAND, ASSIGNOR TO TELEGRAPH CONSTRUCTION AND MAINTENANCE COMPANY, LIMITED, OF LONDON, ENGLAND.

GALVANOMETER AND LIKE RECORDING INSTRUMENT.

Application filed November 21, 1924, Serial No. 751,291, and in Great Britain August 16, 1924.

This invention relates to delicate recording instruments such as are employed for recording very weak signals received from long distance cables, the instruments being of the type comprising a moving coil suspended in a magnetic field and capable of turning on an axis (usually vertical) in either direction, according to the currents received.

The object of the present invention is to provide improved means for connecting the coil to a recorder, such as a siphon.

Heretofore it has been customary in delicate recording instruments of this type to connect the coil to the recorder by a pair of reins made of silk or the like. This construction possesses the disadvantage that it is difficult properly to adjust the length of the two reins. In order to overcome this disadvantage, it has been proposed to connect the coil to the recorder by a single rein of silk or the like. With this latter construction, it is necessary to provide means, such as a spring, or to mount the recorder on springy material, by which the return movement is imparted to the recorder.

According to the present invention I connect the coil to the recorder by a rod or tube of rigid material, such as a glass tube, for example.

Preferably each end of the rod or tube is provided with a short strip of flexible material, such as phosphor bronze, by means of which the rod or tube is connected to the coil and recorder, the strips being sufficiently flexible to allow the necessary turning movement of the coil and recorder.

Preferably means are provided for vibrating the rod or tube in a lateral direction, viz, in a direction at right angles to its axis. This permits a rod or tube of lighter construction to be employed than would otherwise be necessary properly to effect the return movement of the recorder.

In the accompanying drawing which shows diagrammatically one way of carrying out my invention as applied to a siphon recorder applicable for use with a submarine cable, Figure 1 is a plan and Figure 2 is an elevation of Figure 1, some of the parts being omitted from the figures for the sake of clearness.

1, 1 are the poles of a permanent magnet and 2 is a coil to which the cable is connected and which is delicately suspended in the usual manner in the field of the magnet. 3 is a strip of phosphor bronze to which is fastened a carrier 4 for a siphon pen 5, one end of which dips into an ink reservoir 6, while the other marks a travelling strip of paper 7, passing over rollers 8 in the usual manner.

The strip 3 is connected at one end to the armature 9 of a buzzer 10 of usual construction, while the other end is connected to a spring 11 by means of which the strip is put under tension.

The coil 2 is connected to the carrier 4 by a glass tube 12 having at its ends short strips of phosphor bronze 13, 14, which are sufficiently flexible to allow the necessary turning movement of the coil and the carrier. The end of the strip 13 is provided with an eye which engages a pin 15 on the coil 2, while the end of the strip 14 is provided with a hook to enable it to engage any desired one of a number of holes 16 in the carrier 4.

In operation the oscillating movements of the coil 2 are transmitted to the siphon pen carrier 4 through the tube 12 and strips 13, 14. The strip 3 on which the siphon pen carrier 4 is mounted is vibrated by the buzzer 9 and transmits its vibrations to the tube 12.

What I claim is:—

1. In a micro-galvanometer and like recording instrument suitable for receiving signals of minute power, the combination of means for producing a magnetic field, a coil immersed therein and capable of turning about an axis, a flexible strip, a recorder mounted on said strip, and a tube of glass connecting the coil to the recorder.

2. In a micro-galvanometer and like recording instrument suitable for receiving signals of minute power, the combination of means for producing a magnetic field, a coil immersed therein and capable of turning about an axis, a flexible strip, a recorder mounted on said strip, and rigid means connected by flexible means to the coil and to the recorder.

3. In a micro-galvanometer and like recording instrument suitable for receiving signals of minute power, the combination of means for producing a magnetic filed, a coil immersed therein and capable of turning about an axis, a flexible strip, a recorder mounted on said strip, and a rigid tube connected by flexible means to the coil and to the recorder.

4. In a micro-galvanometer and like recording instrument suitable for receiving signals of minute power, the combination of means for producing a magnetic field, a coil immersed therein and capable of turning about an axis, a flexible strip, a recorder mounted on said strip, and a tube of glass connected by flexible means to the coil and to the recorder.

5. In a micro-galvanometer and like recording instrument suitable for receiving signals of minute power, the combination of means for producing a magnetic field, a coil immersed therein and capable of turning about an axis, a flexible strip, a recorder mounted on said strip, a tube of glass connecting the coil to the recorder, and means for vibrating the tube of glass in a lateral direction.

6. In a micro-galvanometer and like recording instrument suitable for receiving signals of minute power, the combination of means for producing a magnetic field, a coil immersed therein and capable of turning about an axis, a flexible strip, a recorder mounted on said strip, rigid means connected by flexible means to the coil and to the recorder, and means for vibrating the rigid means in a lateral direction.

7. In a micro-galvanometer and like recording instrument suitable for receiving signals of minute power, the combination of means for producing a magnetic field, a coil immersed therein and capable of turning about an axis, a flexible strip, a recorder mounted on said strip, a rigid tube connected by flexible means to the coil and to the recorder, and means for vibrating the rigid tube in a lateral direction.

8. In a micro-galvanometer and like recording instrument suitable for receiving signals of minute power, the combination of means for producing a magnetic field, a coil immersed therein and capable of turning about an axis, a flexible strip, a recorder mounted on said strip, a tube of glass connected by flexible means to the coil and to the recorder, and means for vibrating the tube of glass in a lateral direction.

In testimony that I claim the foregoing as my invention I have signed my name this 27th day of October, 1924.

JOHN RIDDLE.